United States Patent [19]

Simpson et al.

[11] Patent Number: 5,765,728
[45] Date of Patent: Jun. 16, 1998

[54] METHOD AND APPARATUS FOR FEEDING CHOPPED POLYESTER SCRAP

[75] Inventors: Brian Leigh Simpson, Hamlin; Gerald Douglas Knight, Rochester; Richard Arthur Tietz, Leroy; Mark Louis Quadrini, Rochester, all of N.Y.

[73] Assignee: Eastman Kodak Company, Rochester, N.Y.

[21] Appl. No.: 677,757

[22] Filed: Jul. 10, 1996

Related U.S. Application Data

[63] Continuation of Ser. No. 411,036, Mar. 27, 1995, abandoned.

[51] Int. Cl.[6] .................... G01F 11/24; B65G 53/46
[52] U.S. Cl. .............. 222/146.2; 222/367; 406/48; 406/62; 406/168; 406/175
[58] Field of Search .................. 406/46, 48, 62, 406/63, 64, 65, 67, 84, 144, 154, 168, 173, 175; 222/146.2, 146.4, 367, 410

[56] References Cited

U.S. PATENT DOCUMENTS

| | | | |
|---|---|---|---|
| 1,524,270 | 1/1925 | Miller et al. | 406/62 X |
| 2,663,465 | 12/1953 | Hogin | 406/62 X |
| 2,827,333 | 3/1958 | Wallin | 406/65 X |
| 3,037,050 | 5/1962 | Heisenberg et al. | 560/96 |
| 3,085,831 | 4/1963 | Mylting | 406/65 |
| 3,236,565 | 2/1966 | Kester et al. | 406/173 |
| 3,273,758 | 9/1966 | Starrett | 406/64 X |
| 3,321,510 | 5/1967 | Lotz et al. | 560/96 |
| 3,593,891 | 7/1971 | Kidd | 406/65 |
| 3,761,136 | 9/1973 | Every | 406/48 |
| 3,776,945 | 12/1973 | Ligorati et al. | 560/96 |
| 4,268,205 | 5/1981 | Vacca et al. | 414/219 |
| 4,409,918 | 10/1983 | Wagner | 114/40 |
| 4,427,136 | 1/1984 | MacKay et al. | 222/368 |
| 4,514,114 | 4/1985 | Fuss et al. | 406/65 |
| 4,775,697 | 10/1988 | Schoenhard | 521/48 |
| 4,789,272 | 12/1988 | Matsubara et al. | 406/48 |
| 4,955,989 | 9/1990 | Mink | 406/124 X |
| 5,002,084 | 3/1991 | Wilson | 137/15 |
| 5,051,528 | 9/1991 | Naujokas et al. | 560/78 |
| 5,070,624 | 12/1991 | Vero et al. | 34/429 |
| 5,298,530 | 3/1994 | Gamble et al. | 521/48.5 |

FOREIGN PATENT DOCUMENTS

| | | | |
|---|---|---|---|
| 659905 | 4/1979 | U.S.S.R. | 222/146.4 |

Primary Examiner—Andrew C. Pike
Attorney, Agent, or Firm—Mark G. Bocchetti; Charles E. Snee, III

[57] ABSTRACT

An improved system (10) conveys comminuted material from a source (12) to a vessel (14), especially for continuously conveying chopped poly(ethyleneterephthalate), or PET, into a methanolysis recovery reactor without entrainment of air into the reactor and without frequent jamming of the apparatus. A single rotary vane valve (36) is provided in the conveyance path at an inlet (38) to the vessel. The valve has clearances between the vanes (44) and the housing (48) larger than the smallest dimension of the comminuted material to prevent jamming of the rotor by PET flakes. The internal spaces (52, 47) in the valve are continuously purged with nitrogen at sufficient volume and pressure such that gases and fumes in the vessel are substantially prevented from passing upward through the valve. Nitrogen also flows from the valve countercurrently through the supply ducts (26, 30) to strip entrained air from the incoming material. Preferably, additional nitrogen is introduced into the supply duct (30) ahead of the valve to assist in air removal from the material. Internal valve surfaces (64) are heated to prevent condensation of gases and fumes from the vessel, thereby preventing sticking and clogging of the comminuted material within the valve. A slide (28) for entry of material into the valve is provided at a 40° angle to assure uniform flow of material. The comminuted material is conveyed from the source by high-velocity air (17) and can be humidified (66) as needed to prevent sticking or clumping in the conveyance path.

27 Claims, 5 Drawing Sheets

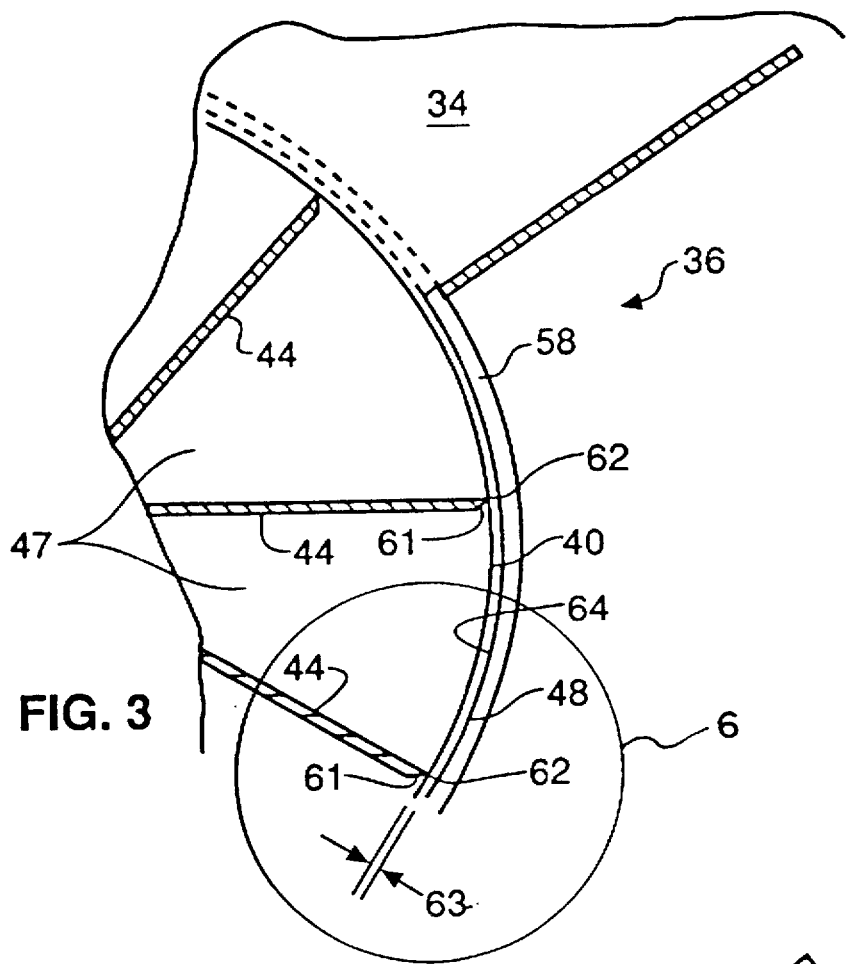
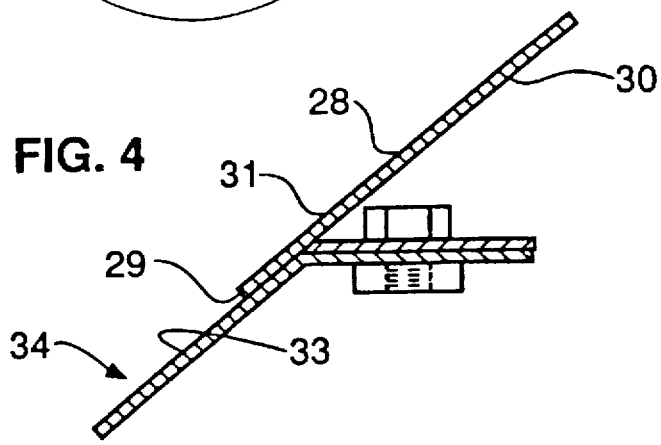

METHOD AND APPARATUS FOR FEEDING CHOPPED POLYESTER SCRAP

This is a continuation of application Ser. No. 08/411,036, filed Mar. 27, 1995, now abandoned.

FIELD OF THE INVENTION

The invention relates to conveying comminuted material, more particularly to conveying chopped plastic, and most particularly conveying chopped poly(ethyleneterephthalate) sheeting to a chemical reactor for recovery of constituents.

BACKGROUND OF THE INVENTION

Poly(ethyleneterephthalate), also known as PET, is a polyester polymer widely used in manufacturing, for example, fabrics, containers, and film base. Typically, substantial waste or scrap PET is generated during forming of articles for use. Some articles such as PET bottles and film base are intended for single use. It can be economically desirable, therefore, to recycle used PET through mechanical and chemical processes to recover its chemical constituents.

Various methods have been disclosed for the recovery of ethylene glycol and terephthalic acid or derivatives thereof from PET. Typically, PET waste is comminuted and then decomposed by exposure to methanol in a suitable reactor at high temperatures, a process known generically as "methanolysis". U.S. Pat. Nos. 5,051,528; 3,776,945; 3,321,510; and 3,037,050, for example, disclose schemes for methanolic digestion of comminuted PET.

It is highly desirable in general that methanolysis be carried out in a continuous, rather than batch, process. Steady state conditions of optimum control can be achieved and maintained, and process throughput can be much greater for continuous processing.

Such a process requires the continuous addition of scrap PET to a reactor vessel. Because the atmosphere within the vessel would be explosive if substantial amounts of oxygen or air were admitted with the scrap material, the entrance port to the vessel must be specially designed to exclude virtually all oxygen while providing a steady, nonclogging flow of scrap. To prevent backflow of volatiles from the vessel and to prevent discharge of process materials through the entrance port in event of malfunction within the vessel, a positive locking means is generally employed at the entrance port. This lock typically comprises a rotary vane valve consisting of a closed cylindrical housing with material inlet and outlet openings through the housing wall, and an externally driven rotor unit within the housing, having a number of pockets for transferring material from the inlet to the outlet. Typical rotary vane valves are disclosed in U.S. Pat. Nos. 4,268,205; 4,427,136; and 5,002,084.

The processing of polyester scrap such as shredded bottles or molding waste is a demanding application. High temperature in the reactor, and the presence of high-boiling compounds which readily condense on valve surfaces and thereby foul the mechanism, heretofore have made single-valve lock systems impractical. An additional problem is encountered in continuous addition of chopped or flaked PET sheeting to a vessel through a lock, as the flakes can readily jam known rotary valves having close vane-to-housing clearances. Commercial systems are available which utilize a screw auger feeder in combination with an upstream rotary valve having wide internal clearances to provide positive feeding of PET scrap through this condensing inlet zone. Such a system is mechanically complex and is expensive to install, maintain, and operate.

An additional demand in PET methanolysis systems is the need to remove oxygen from the feed stream and to replace it with an inexpensive inert gas such as nitrogen. Heretofore, two valves in series have been proposed to provide both sufficient vessel isolation and atmosphere changeover, as disclosed in U.S. Pat. No. 5,298,530 (FIG. 1). The upper valve is typically at the ambient temperature of the feed, and the lower valve is nearer the ambient temperature of the vessel. Such a double-valve system is also expensive, consumptive of space, inefficient, and requires high maintenance.

Known rotary valves can be easily clogged or jammed by particles of scrap coming between the radial outer ends of the rotating vanes and the wall of the housing, especially when the particles are highly tabular. U.S. Pat. No. 4,268,205 discloses method and apparatus for providing "a thin sheet of high-velocity air directed across the vane ends [to] blast off any material clinging to the ends before the vanes come into pressure-sealing relationship with the housing". This adds mechanical complexity and cost to an installation incorporating the disclosed valve, which still may not be capable of dealing with severely clumped flow of material into the valve.

Polyester scrap is commonly fed through a conveyance path comprising piping and ducting from a source to an inlet of a rotary valve by a combination of high-velocity air and gravity. A common problem in the art is unstable and variable flow of chopped scrap in the approach to the rotary valve inlet, which can lead to variable-volume flow into the valve, clumping of the scrap, and choking or plugging of the valve, necessitating a shutdown of the process.

PET is an electrostatically active polymer, and chopped PET can tend to cling and clump electrostatically in conveyance systems, particularly systems which convey chips by pneumatics and gravity rather than by positive mechanical means, and particularly when the chopped PET is tabular.

SUMMARY OF THE INVENTION

It is a principal object of the invention to provide an improved method and apparatus for continuously feeding comminuted polyester to a reactor vessel without clumping.

It is a further object of the invention to provide an improved method and apparatus for feeding tabular polyester chips which prevents jamming of the vanes of a rotary valve against the valve housing.

It is a still further object of the invention to provide an improved rotary valve for feeding polyester chips to a reactor, in which valve the condensation of materials from the reactor is prevented.

It is a still further object of the invention of provide an improved method and apparatus for feeding polyester chips to a reactor which requires only one rotary valve.

Our invention is defined by the claims. The apparatus and method of the invention are useful in continuous, uniform conveying of comminuted materials to a vessel, and particularly for feeding or conveying tabular, chopped PET to a reactor such as a high-temperature digester.

Briefly described, polyester chips or flakes are conveyed from a chipper or remote chip storage location preferably by entrainment in high-velocity air through a conveyor pipeline. For example, the chips can be fed into and driven by a fan or, preferably, by a pressurized-air eductor downstream from the storage location which serves also to draw chopped material into the air stream by venturi-induced vacuum. Chips are conveyed thereby to an air/solids separator located, preferably, above the reactor. The separator may be of known design such as a cyclonic separator or, preferably, a simple pressure-drop chamber vented at the top and having an angled bottom leading to an outlet duct which leads to a rotary vane valve, preferably having a side inlet, disposed on an inlet duct to the high-temperature reactor. Chips are separated from the air stream in the separator, fall to the angled bottom, and slide into the outlet duct under the force of gravity. The outlet duct preferably has a first vertical portion in which the chips free fall toward a second, inclined portion. Nitrogen, flowing upward toward the separation chamber as exhaust from lower in the process (as will be described subsequently), displaces air entrained with the chips. The lower portion of the duct is provided with a preferably planar lower surface inclined at, preferably, between 30 and 45 degrees from the horizontal, most preferably at 35–40 degrees. The inclined surface is preferably unfeatured and continuous from the landing point of the chips to the entrance lip of the side-inlet rotary vane valve. We have found that inclines within this range permit polyester chips to flow in a smooth, uniform sheet. At angles below the preferred range, material piles up on the surface and either moves sporadically or clogs the duct. At angles above the preferred range, sheet flow is unstable and clumping can occur.

The rotary vane valve is provided with a plurality of axial vanes, preferably 8–12, disposed radially on a rotor shaft in a housing, the shaft being supported by bearings having substantially no axial and radial runout. The shaft is driven from outside the housing. The vanes are preferably shrouded by continuous circular sidewalls at the axial ends of the vanes, so that discrete pockets are formed between the vanes, and chips within the valve are isolated from the stationary sidewalls of the valve housing.

Rotary vane valves in the known art generally are provided with vanes having at their outer edges a very close spacing to the circumferential housing to maximize the sealing action of the valve. This spacing can be 0.15 mm (6 mils) or less. However, such a tight spacing makes known valves very susceptible to jamming by chips thicker than the spacing. For example, PET photographic support is commonly provided in various thicknesses up to 0.175 mm (7 mils), and tabular chips of support can easily jam a valve having clearances of 0.175 mm or less. We have found unexpectedly that when the vane clearance is increased to about twice the nominal thickness of the chips or flakes being conveyed, and when the flow of material into the valve is substantially uniform, jamming of the vanes against the housing is substantially eliminated without any noticeable change in sealing performance of the valve.

The valve is further provided with one or more purge ports in the sidewalls of the housing through which pressurized nitrogen gas is admitted to the interior of the valve. Nitrogen fills the spaces between the stationary sidewalls and the rotating circular sidewalls and flows axially around the circumference of the sidewalls and into the working areas of the valve. Preferably, the flow of nitrogen is sufficient that gas pressure within the valve is higher than the process pressures upstream and downstream of the valve, so that a small portion of the nitrogen flows from the valve into the reactor and a larger portion flows upstream through the feed duct, as described supra. Preferably, additional nitrogen is provided through a port in the feed duct, such that an effective barrier to the passage of oxygen into the vessel is established. We have found that purging the valve continually with a high flow of nitrogen while introducing additional nitrogen upstream of the valve permits a feed system requiring only one rotary vane valve.

The valve is further provided with a heating jacket around its circumferential periphery through which steam is circulated. This heats the working surfaces of the valve to a temperature, preferably 150° C. or above for digesting PET, at which temperatures the condensation of vapors of process chemicals from the reactor does not occur. Preferably, the nitrogen being provided to the valve is also heated prior to introduction to prevent cooling of the working surfaces.

PET chips being conveyed to the valve can clump or stick because of electrostatic charging. We have found that addition of small amounts of moisture to the feed stream can greatly improve the flowability of the stream by discharging electrostatic charges on the surface of the chips. For chips derived from, for example, photographic film waste which has been washed or otherwise subjected to silver recovery, adequate moisture can be already present in the stream. However, dry, freshly chopped PET may require moisture addition. Adding moisture improves flowability when the dewpoint of the conveying air is below about 5° C. Moisture can be provided conveniently, for example, through a steam injection port in the conveyance eductor. A dewpoint sensor and feedback control circuit can also be provided if desired.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which:

FIG. 3 is a detailed view of a portion of the rotary vane valve shown within circle 3 in FIG. 1;

FIG. 4 is a detailed view of a portion of the feed duct shown within circle 4 in FIG. 1;

DETAILED DESCRIPTION OF THE INVENTION

Figure 1:
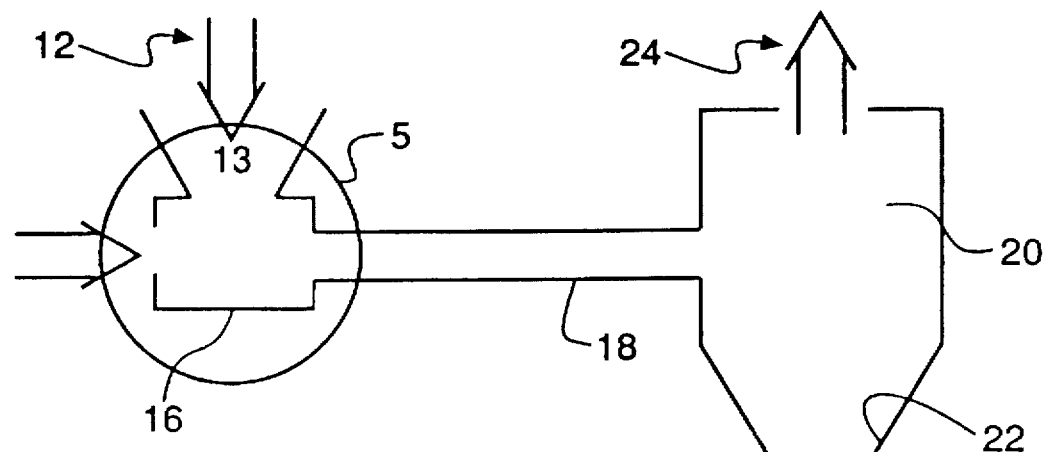
FIG. 1 is a schematic cross section in elevation of a chopped PET feed system in accordance with the invention.
Figure 2:
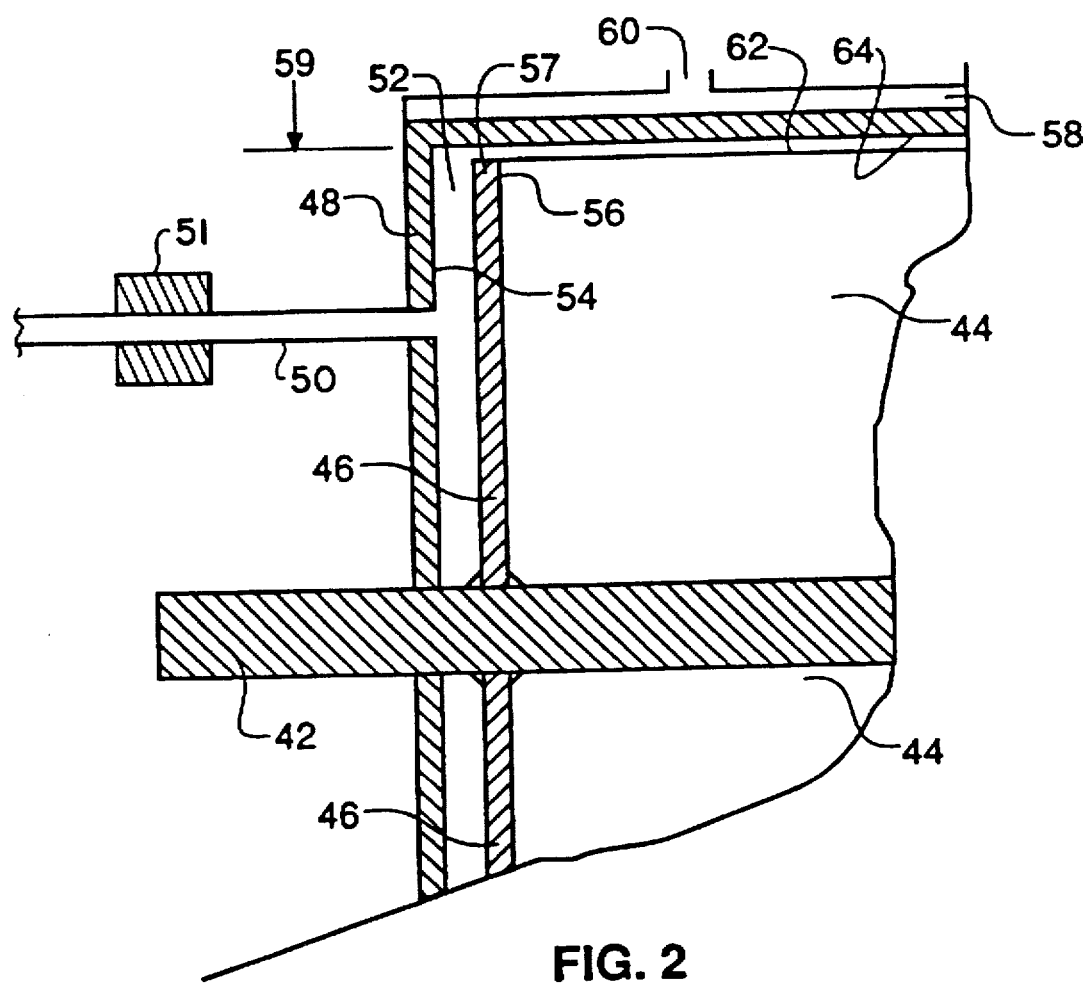
FIG. 2 is a cross-sectional view through a portion of a rotary vane valve in accordance with the invention, taken along line 2—2 in FIG. 1.
Figure 5:
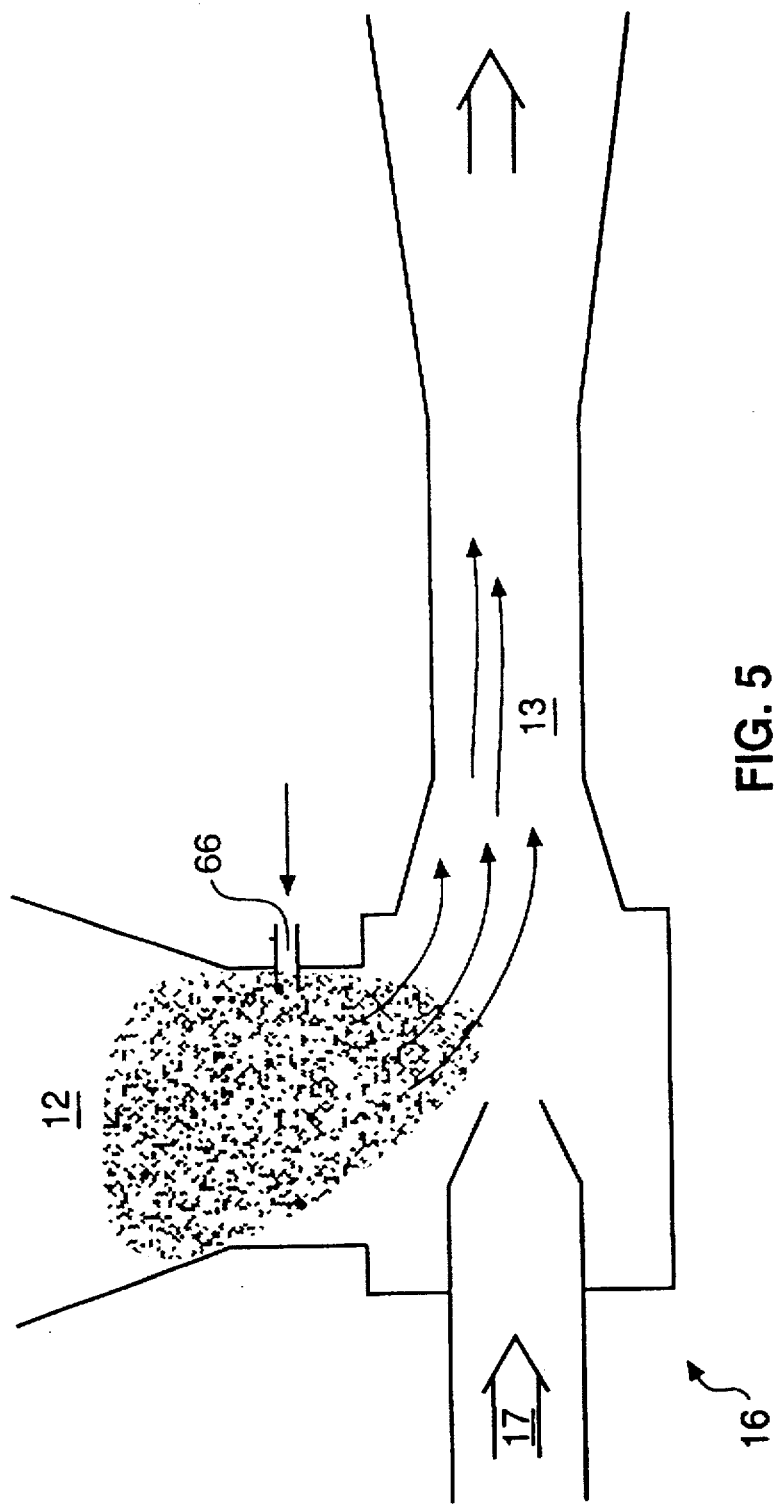
FIG. 5 is a schematic cross section in elevation of a pressurized-air eductor shown within circle 5 in FIG. 1.
Figure 6:
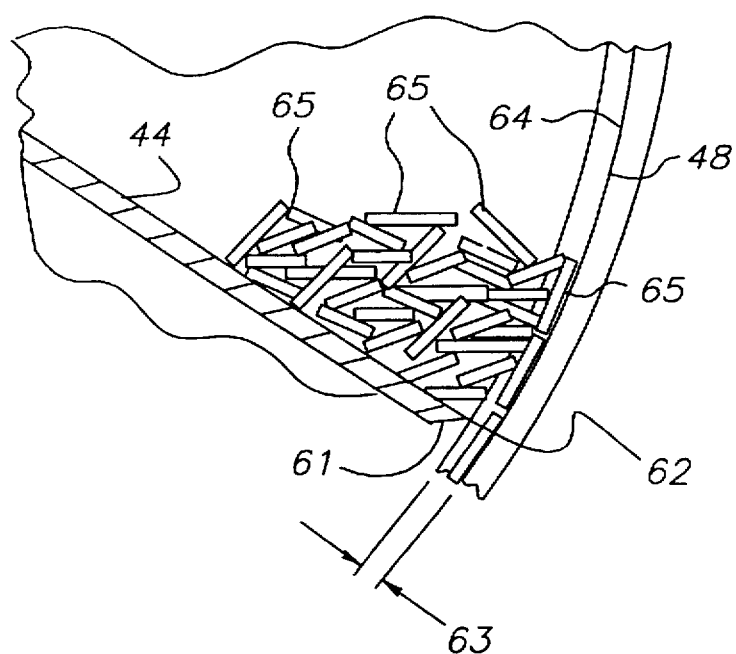
FIG. 6 is an enlarged view of that portion of the rotary vane valve shown within circle 6 of FIG. 3 and depicting exemplary flakes of solid material being conveyed by the rotary vane valve.

Our invention provides improved method and apparatus for safely and effectively conveying comminuted material from a storage or feed location to a vessel.

Referring to the drawings, a feed system 10 for comminuted material extends between a supply location 12 and a vessel 14 having a mixer and shaft 15. The comminuted material can be, for example, shredded or chopped plastic waste such as returned plastic bottles. System 10 can accommodate a wide range of particle sizes and shapes, as well as contaminants such as bottle caps and wood chips, although it is particularly well suited to conveying chips or flakes of PET sheeting such as film support which has been chopped and washed. Location 12 can be, for example, a storage bin or hopper, or the direct output of a chopper or comminuter. In a preferred embodiment, chopped material such as tabular PET is drawn or flows 13 under gravity from location 12 into motivating means 16 which can be, for example, a high-velocity fan or, more preferably, an eductor fed by pressurized air 17. Material is propelled by high-velocity air through conveyor pipeline 18 which leads to separator 20 which is preferably a distance above vessel 14. This portion of feed system 10 is of practical utility when the comminuter is substantially remote from vessel 14. In the alternative, the comminuter or storage location 12 can be located physically above vessel 14. In simplest form, the feed system operates by gravity and requires no air conveyance.

In separator 20, air velocity drops abruptly, and entrained material falls to the sloping bottom 22 of separator 20. The conveyance air is exhausted 24 upward through the top of the separator. A filter system (not shown) may be employed at this outlet to retain fines which can be returned to the feed stream, improving yield. Material flowrate from the eductor is controlled to prevent overloading of the separator, leading to bridging of material at the separator outlet and stoppage of flow to the vessel. One skilled in the art can determine without undue experimentation the flowrate and flake size best suited to a specific application.

Material slides under gravity down sloping bottom 22 and enters vertical supply duct 26 where it falls free through the prevailing atmosphere. Duct 26 may comprise a flexible spool piece. Below duct 26, material lands on inner surface 28 of inclined supply duct 30. Surface 28 preferably is substantially planar and provided with a substantially mill finish. It need not be highly polished, and bare steel or stainless steel is acceptable. Surface 28 is inclined downward from horizontal at an angle 32 of preferably about 30° to about 45°, most preferably at 35°–40°.

Duct 30 is connected to the inlet duct or throat 34 of rotary vane valve 36, preferably being of side-entry design, which valve communicates with the interior of vessel 14 via feed duct 38 which may be, for example, a flexible spool piece. Feed duct 38 can incorporate one or more safety shutoff valves (not shown). Preferably, duct 30 and throat 34 are both as wide as the inlet to valve 36. Valve 36 serves to meter comminuted material from the supply duct into the vessel and to isolate the feed system elements above the valve from the vapors, liquids, temperatures, and pressures within the vessel. A stock valve design suitable for modification in accordance with the invention is, for example, Model SE, available from The Young Industries, Inc., Muncy, Pa. 17798 USA, having a nominal 500 mm diameter.

Valve 36 comprises a rotor 40 having a shaft 42 and a plurality of axial vanes 44, for example, 12 vanes for a Model SE rotor, extending radially from shaft 42 and bounded by sideplates 46 at either end forming a plurality of pockets 47 therebetween, the rotor disposed in a cylindrical housing 48 having openings for connection to throat 34 and feed duct 38. The rotor shaft 42 is supported by bearings and driven by a motor (not shown) outside housing 48. The rotor is turned at a rate to provide filling of, preferably, about 20% of the volume of each pocket 47. Maximum material flowrate permissible depends upon, at least, type of material being conveyed, shape of particles, dimensions of particles, and size of the valve inlet opening. For example, we have found that flakes of PET 0.175 mm thick and 6 mm to 18 mm in mean size conveyed reliably through a Model SE valve, modified in accordance with the present invention, having a 12-vaned rotor turning at 15 rpm with a pocket fill of 20%.

Material slides uniformly and continuously along duct 30 and throat 34 and enters valve 36. It is carried in the rotor pockets 47 through a partial revolution of the rotor and is dumped by gravity into feed duct 38 and thence into vessel 14.

Housing 48 is adapted with port 50 whereby nitrogen gas is admitted under pressure to the space 52 between rotor sideplate 46 and housing sidewall 54. For valve Model SE, the nitrogen flow rate is preferably about 100 cfm. Both sidewalls 54 are so adapted. Nitrogen under pressure fills space 52 and flows around the periphery 56 of rotor sideplate 46 through annular space 57 which is preferably about 0.375 mm in width 59, the flow preventing comminuted material from entering these areas and jamming periphery 56. Nitrogen fills the pockets 47 and floods all internal spaces within the valve. It flows in sufficient volume that the ambient pressure within the valve is slightly greater than both the process pressure within the vessel and the ambient pressure in the material supply ducts 26 and 30. Therefore, nitrogen flows out of valve 36 both into the vessel and upward through the supply ducts. To increase the flow of nitrogen up the ducts without a proportionate increase in nitrogen flowing into the vessel, preferably an additional nitrogen port 39 is provided in supply duct 30. In ducts 26 and 30, nitrogen flows counter to the direction of flow of comminuted material and in so doing, especially in vertical duct 26, strips away air entrained with the material and carries the air upward into separator 20, thereby substantially preventing atmospheric oxygen from being carried into the vessel by the material.

Housing 48 is further adapted with heating jacket 58 having ports 60 whereby steam is introduced to heat sidewalls 54 to a temperature greater than 125° C., preferably 150° C. At these elevated temperatures, vapors of high-boiling compounds in the vessel, such as ethylene glycol and dimethylterephthalate, cannot condense on exposed valve surfaces and thereby foul the mechanism. Preferably, the nitrogen gas, provided as described supra, is also preheated in a heat exchanger 51 prior to introduction into space 52 to avoid cooling of valve parts.

Within valve 36, the tips 62 of vanes 44 are chamfered slightly on the their trailing edges 61 and are provided with clearance 63 from the cylindrical inner surface 64 of housing 48 of preferably from one to three times the minimum dimension of the tabular flakes or chips being conveyed and most preferably about twice the minimum dimension of tabular flakes or chips 65 being conveyed. For example, for tabular flakes of PET photographic support having a nominal thickness of 0.175 mm (7 mils), a preferred clearance is 0.375 mm (15 mils). We have found that under these conditions the valve can operate essentially indefinitely without jamming on PET flakes. We believe the reason that these clearances are acceptable in accordance with our invention is because the high flow of nitrogen out of the valve prohibits the escape of noxious fumes from the vessel.

An important aspect of our invention is the angle and length given to the inclined supply duct 26 and the valve throat 34, and the smoothness of the joint 29 between them on inner surface 28. As shown in FIG. 4, joint 29 is preferably a shingle or lap joint of a flange 31 overlapping the upper surface 33 of throat 34. Given this angle of repose, comminuted material landing on surface 28 continuously forms a uniform layer which slides down surface 28 in a sheet-like flow at a uniform velocity without breaking up into cells or clumping. When angle 32 is less than about 30°, material may not move readily and uniformly down the slope under gravity. When angle 32 is greater than about 45°, material moves too readily down the slope and the uniform sheet tends to break up into clumps which slide nonuniformly in the valve. In either case, even the rotary valve modified as described supra with greater internal clearances, steam heating, and nitrogen purging can be jammed by the clumping or non-uniform flow of material entering the valve, which malfunction is obviated by use of a proper feed angle in accordance with the invention. The combined length of surface 28 and surface 33 is such that material falling through vertical duct 26 does not fall directly into valve 36 or bounce from surface 28 but instead comes to rest on surface 28 and forms a smoothly sliding layer.

Some comminuted materials to be air conveyed, for example, dry, tabular PET, tend to clump or stick from static electricity. We have found that humidification of the air stream greatly relieves this tendency. Water, or preferably low-pressure steam, is injected into the material flow, preferably through a port 66 in the throat of eductor 16. Some PET flakes, for example, those from a silver recovery treatment, may be sufficiently damp that no humidification is required. Others may benefit substantially. We have found that good conveyance occurs when RH is above 30% and/or dewpoint is above 5° C. in the air stream. Manual or automatic systems of known design can be used to maintain these minima as required.

The many features and advantages of the invention are apparent from the detailed specification and thus it is intended by the appended claims to cover all such features and advantages which fall within the true spirit and scope of the invention. Further, since numerous modifications and changes thereto will readily occur to those skilled in the art, it is not desired to limit the invention to the exact construction and operation illustrated and described, and accordingly all suitable modifications and equivalents may be resorted to falling within the scope of the invention.

Parts list 10 comminuted materials conveyance system
12 materials supply location
13 flow of materials into 16
14 vessel or reactor
15 mixer and shaft
16 eductor
17 pressurized air flow to eductor
18 conveyor pipeline
20 separator
22 sloping bottom of 20
24 exhaust flow from 20
26 vertical supply duct
28 inner surface of 30
29 joint between 30 and 34
30 inclined supply duct
31 flange
32 angle of slope of 30
33 upper surface of 34
34 throat of 36
36 side-entry rotary vane valve
38 feed duct to vessel
39 nitrogen port in 30
40 rotor
42 rotor shaft
44 axial vanes
46 rotor sideplates
47 rotor pockets
48 cylindrical housing
50 nitrogen port in 48
51 heat exchanger
52 endspace within 36
54 housing sidewalls
56 periphery of 46
57 annular space between 48 and 56
58 heating jacket
59 dimension of 57
60 steam ports in 58
61 chamfered trailing edge of 62
62 tips of vanes
63 clearance between 62 and 64
64 inner surface of 48
65 tabular flakes or chips
66 humidification port

What is claimed is:

1. An apparatus comprising:

(a) a source containing flakes of solid material, said flakes of solid material having two substantially planar surfaces separated by a distance and a smallest dimension defined by the distance between said two substantially planar surfaces, said source having a first atmosphere and operating at a first pressure;

(b) a rotary vane valve including a housing with a plurality of vanes therein, said rotary vane valve having a clearance between said housing and said plurality of vanes which is greater than said smallest dimension and not greater than about three times said smallest dimension, said rotary vane valve metering said flakes flowing from said source to said vessel, said rotary vane valve receiving said flakes of solid material from said source through a feed duct;

(c) an outlet duct from said rotary vane valve to which said flakes of solid material are metered by said rotary vane valve;

(d) a vessel which receives said flakes of solid material from said rotary vane valve through said outlet duct, said vessel containing a second atmosphere and operating at a second pressure, said second pressure being above ambient pressure and greater than said first pressure; and (e) an inert gas supplied to said rotary vane valve, said inert gas being maintained at an operating pressure within said rotary vane valve which is greater than said second pressure, said inert gas and said clearance preventing both the first atmosphere of the source and the second atmosphere of the vessel from passing through said rotary vane valve.

2. An apparatus for conveying flakes of solid material from a source, said flakes of solid material having two substantially planar surfaces separated by a distance, said flakes having a smallest dimension defined by the distance between said two substantially planar surfaces, said source operating at a first pressure, to a vessel operating at a second pressure which is above ambient pressure and greater than said first pressure, said source having an oxygen-containing atmosphere, and said vessel containing a substantially oxygen-free atmosphere of gases and vapors, said apparatus comprising:

(a) a rotary vane valve including a housing with a plurality of vanes therein, said rotary vane valve metering said flakes being conveyed from said source to said vessel, said rotary vane valve having a clearance between said housing and said plurality of vanes, said clearance being greater than said smallest dimension and not greater than about three times said smallest dimension;

(b) a feed duct from said source to said rotary vane valve;

(c) an outlet duct from said rotary vane valve to said vessel; and (d) an inert gas within said rotary vane valve maintained at an operating pressure within said rotary vane valve which is greater than said second pressure, said inert gas and said clearance preventing both the oxygen-containing atmosphere of the source and the oxygen-free atmosphere of the vessel from passing through said rotary vane valve.

3. An apparatus as recited in claim 2 further comprising: means for maintaining said rotary vane valve at a temperature above a condensation temperature of the oxygen-free atmosphere contained within said vessel.

4. An apparatus as recited in claim 2 further comprising: means for humidifying the flakes of solid material to be in equilibrium with the oxygen-containing atmosphere at a dew point of 5° C.

5. An apparatus as recited in claim 2 wherein:

said feed duct includes an inclined flat surface for supporting said flakes, said inclined flat surface of said feed duct being angled at from about 30° to about 45° from horizontal, said flakes flowing by gravity down said inclined flat surface in a generally smooth, uniform sheet.

6. An apparatus as recited in claim 2 wherein:

said feed duct includes an inclined flat surface for supporting said flakes, said inclined flat surface of said feed duct being angled at from about 35° to about 40° from horizontal.

7. An apparatus as recited in claim 2 further comprising:

an inlet in said feed duct for introducing said inert gas into said feed duct at a pressure which is greater than said first pressure.

8. An apparatus as recited in claim 2 wherein:

said flakes of solid material are chopped poly(ethyleneterephthalate).

9. An apparatus as recited claim 8 wherein:

said vessel is part of a methanolysis system for decomposing said chopped poly(ethyleneterephthalate).

10. An apparatus as recited in claim 2 wherein:

said inert gas is nitrogen.

11. An apparatus in combination with comminuted solid material, said apparatus for conveying said comminuted solid material from a source, said source operating at a first pressure, to a vessel operating at a second pressure which is above ambient pressure and greater than said first pressure, said source having a first atmosphere, and said vessel containing a second atmosphere of gases and vapors, said second atmosphere being different from said first atmosphere, said apparatus comprising:

(a) a rotary vane valve including a housing with a plurality of vanes therein, said rotary vane valve metering said comminuted solid material flowing from said source to said vessel, said rotary vane valve having a clearance between said housing and said plurality of vanes, each piece of said comminuted material having a substantially common smallest dimension, said clearance being greater than said substantially common smallest dimension and not greater than about three times said substantially common smallest dimension;

(b) a feed duct from said source to said rotary vane valve;

(c) an outlet duct from said rotary vane valve to said vessel; and (d) means for supplying an inert gas to said rotary vane valve and for maintaining said inert gas at an operating pressure within said rotary vane valve which is greater than said second pressure, said means for supplying and maintaining and said clearance preventing both said first atmosphere and said second atmosphere from passing through said rotary vane valve.

12. A method for conveying flakes of solid material from a source, the flakes of solid material having two substantially planar surfaces separated by a distance and a smallest dimension defined by the distance between the two substantially planar surfaces, the flakes of solid material residing in a first atmosphere at a first pressure, to a vessel having a second atmosphere of vapors and gases at a second pressure, the vapors and gases having a condensation temperature, said method comprising the steps of:

(a) flowing the flakes of solid material by gravity from the source through a feed duct to a rotary vane valve, the rotary vane valve including a housing with a plurality of vanes disposed therein, said rotary vane valve having a clearance between said housing and said plurality of vanes, the clearance being greater than said smallest dimension and not greater than about three times the smallest dimension;

(b) metering the flakes of solid material of said flowing step with the rotary vane valve;

(c) discharging the flakes of solid material from the rotary vane valve into a discharge duct, the flakes of solid material flowing from the discharge duct into the vessel;

(d) supplying an inert gas to the rotary vane valve; and (e) maintaining the inert gas within the rotary vane valve at a pressure which is greater than both said first pressure and said second pressure thereby preventing both the first atmosphere and the second atmosphere from passing through the rotary vane valve.

13. A method as recited in claim 12 further comprising the step of:

maintaining said rotary vane valve at a temperature above a condensation temperature of the vapors and gases contained within said vessel.

14. A method as recited in claim 12 further comprising the step of:

humidifying the flakes of solid material to be in equilibrium with the first atmosphere at a dewpoint of 5° C.

15. A method as recited in claim 12 further comprising the step of:

introducing the inert gas into the feed duct at a pressure which is greater than the first pressure, the inert gas stripping the first atmosphere from the flakes of solid material flowing to the rotary vane valve.

16. A method as recited in claim 12 wherein:

said step of flowing the flakes of solid material comprises flowing chopped poly(ethyleneterephthalate) in a generally uniform sheet flow.

17. A method as recited in claim 16 wherein:

the vessel is part of a methanolysis system for decomposing the chopped poly(ethyleneterephthalate).

18. A method as recited in claim 12 wherein:

the inert gas is nitrogen.

19. A method as recited in claim 12 wherein:

said flowing step is at least partially performed on an inclined flat surface of said feed duct for supporting the flakes of solid material, the inclined flat surface of the feed duct being angled at from about 30° to about 45° from the horizontal, the flakes of solid material flowing by gravity down the inclined flat surface in a generally smooth, uniform sheet as the flakes of solid material enter the rotary vane valve.

20. A Method as recited in claim 12 wherein:

said flowing step is at least partially performed on an inclined flat surface for supporting the flakes of solid material, the inclined flat surface of the feed duct being angled at from about 35° to about 40° from horizontal, the flakes of solid material flowing by gravity down the inclined flat surface in a generally smooth, uniform sheet as the flakes of solid material enter the rotary vane valve.

21. An apparatus for conveying comminuted solid material from a source, each piece of said comminuted solid material having a substantially common smallest dimension, said source operating at a first pressure, to a vessel operating at a second pressure which is above ambient pressure and greater than said first pressure, said source having a first atmosphere, and said vessel containing a second atmosphere of gases and vapors, said second atmosphere being different from said first atmosphere, said apparatus comprising:

(a) a rotary vane valve including a housing with a plurality of vanes therein, said rotary vane valve metering said comminuted solid material being conveyed from said source to said vessel, said rotary vane valve having a clearance between said housing and said plurality of vanes, said clearance being greater than said substantially common smallest dimension and not greater than about three times said substantially common smallest dimension;

(b) a feed duct from said source to said rotary vane valve;

(c) an outlet duct from said rotary vane valve to said vessel; and (d) means for supplying an inert gas to said rotary vane valve and counterflowing said inert gas from said rotary vane valve through said feed duct, said means for supplying and counterflowing said inert gas and said clearance preventing said first atmosphere from passing through said rotary vane valve.

22. An apparatus as recited in claim 21 further comprising:

means for introducing additional inert gas into said feed duct and counterflowing said additional inert gas in a direction away from said rotary vane valve.

23. A method for conveying flakes of solid material from a source, the flakes of solid material having two substantially planar surfaces separated by a distance and a smallest dimension defined by the distance between the two substantially planar surfaces, the flakes of solid material residing in a first atmosphere at a first pressure, to a vessel having a second atmosphere of vapors and gases at a second pressure, the vapors and gases having a condensation temperature, said method comprising the steps of:

(a) flowing the flakes of solid material by gravity from the source through a feed duct to a rotary vane valve, the rotary vane valve including a housing with a plurality of vanes disposed therein, said rotary vane valve having a clearance between said housing and said plurality of vanes, the clearance being greater than said smallest dimension and not greater than about three times the smallest dimension;

(b) metering the flakes of solid material of said flowing step with the rotary vane valve;

(c) discharging the flakes of solid material from the rotary vane valve into a discharge duct, the flakes of solid material flowing from the discharge duct into the vessel;

(d) supplying an inert gas to said rotary vane valve and counterflowing said inert gas from said rotary vane valve through said feed duct, said supplying step and said clearance preventing said first atmosphere from passing through said rotary vane valve; and (e) introducing additional inert gas into said feed duct and counterflowing said additional inert gas in a direction away from said rotary vane valve.

24. An apparatus for conveying comminuted solid material in combination with the comminuted solid material being conveyed, said apparatus conveying said comminuted solid material from a source operating at a first pressure to a vessel operating at a second pressure which is above ambient pressure and greater than said first pressure, said source having a first atmosphere, and said vessel containing a second atmosphere, said second atmosphere being different from said first atmosphere, said apparatus comprising:

(a) a rotary vane valve including a housing with a plurality of vanes therein, said rotary vane valve metering a flow of said comminuted solid material, said rotary vane valve having a clearance between said housing and said plurality of vanes, each piece of said comminuted material having a substantially common smallest dimension, said clearance being greater than said substantially common smallest dimension and not greater than about three times said substantially common smallest dimension;

(b) a feed duct from said source to said rotary vane valve;

(c) an outlet duct from said rotary vane valve to said vessel; and (d) an inert gas flowing into said rotary vane valve at an operating pressure within said rotary vane valve which is greater than said second pressure, said inert gas and said clearance preventing both said first atmosphere and said second atmosphere from passing through said rotary vane valve.

25. A method for conveying flakes of solid material from a source, the flakes of solid material having two substantially planar surfaces separated by a distance and a smallest dimension defined by the distance between the two substantially planar surfaces, the flakes of solid material residing in a first atmosphere at a first pressure, to a vessel having a second atmosphere of vapors and gases at a second pressure, the vapors and gases having a condensation temperature, said method comprising the steps of:

(a) flowing the flakes of solid material by gravity from the source through a feed duct to a rotary vane valve, the rotary vane valve including a housing with a plurality of vanes disposed therein;

(b) providing the rotary vane valve with a clearance between the plurality of vanes and the housing, the clearance being greater than said smallest dimension and not greater than about three times the smallest dimension;

(c) metering the flakes of solid material of said flowing step with the rotary vane valve;

(d) discharging the flakes of solid material from the rotary vane valve into a discharge duct, the flakes of solid material flowing from the discharge duct into the vessel;

(e) supplying an inert gas to the rotary vane valve; and (f) maintaining the inert gas within the rotary vane valve at a pressure which is greater than both said first pressure and said second pressure thereby preventing both the first atmosphere and the second atmosphere from passing through the rotary vane valve.

26. A method for conveying flakes of solid material from a source, the flakes of solid material having two substantially planar surfaces separated by a distance and a smallest dimension defined by the distance between the two substantially planar surfaces, the flakes of solid material residing in a first atmosphere at a first pressure, to a vessel having a second atmosphere, said method comprising the steps of:

(a) flowing the flakes of solid material by gravity from the source through a feed duct to a rotary vane valve, the rotary vane valve including a housing with a plurality of vanes disposed therein, said rotary vane valve having a clearance between said housing and said plurality of vanes, the clearance being greater than said smallest dimension and not greater than about three times the smallest dimension;

(b) metering the flakes of solid material of said flowing step with the rotary vane valve;

(c) discharging the flakes of solid material from the rotary vane valve into a discharge duct, the flakes of solid material flowing from the discharge duct into the vessel;

(d) supplying an inert gas to the rotary vane valve;

(e) maintaining the inert gas within the rotary vane valve at a pressure which is greater than both said first pressure and said second pressure; and (f) transmitting the inert gas through the rotary vane valve to both the feed duct and the discharge duct.

27. An apparatus for conveying comminuted solid material in combination with the comminuted solid material being conveyed, said apparatus comprising:

(a) a rotary vane valve including a housing with a plurality of vanes therein, said rotary vane valve metering a flow of said comminuted solid material, said rotary vane valve having a clearance between said housing and said plurality of vanes, each piece of said comminuted material having a substantially common smallest dimension, said clearance being greater than said substantially common smallest dimension and not greater than about three times said substantially common smallest dimension;

(b) a feed duct from said source to said rotary vane valve;

(c) an outlet duct from said rotary vane valve to said vessel;

(d) a port in said rotary vane valve; and (e) an inert gas flowing into said rotary vane valve through said port, said inert gas flowing from said rotary vane valve into both said feed duct and said outlet duct.

* * * * *